Figure 1:
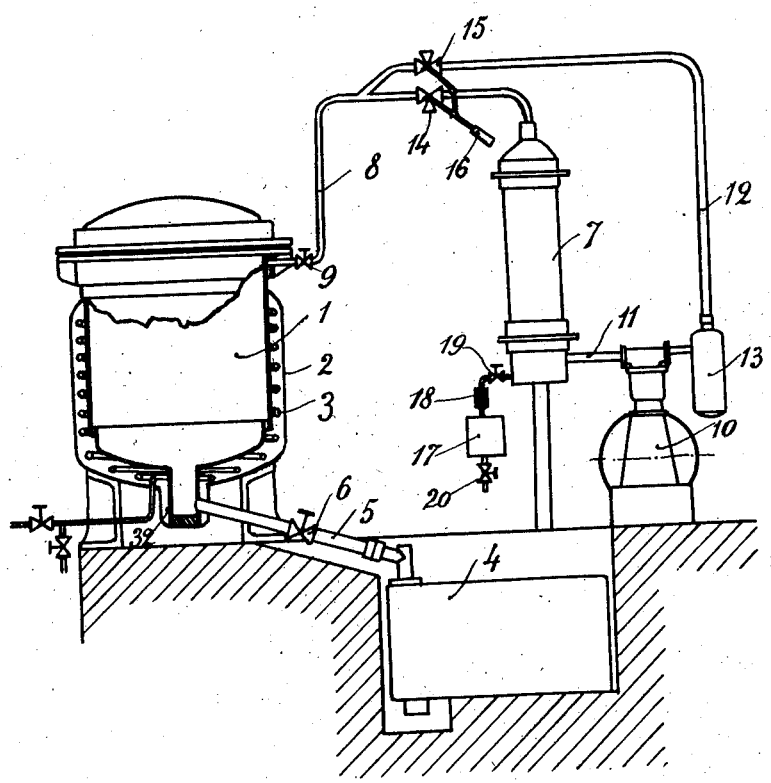

Sept. 24, 1929.   D. A. L. TEXIER   1,729,056
MEANS FOR IMPREGNATING ARTICLES WITH SYNTHETIC RESINS
Filed Nov. 21, 1925   3 Sheets-Sheet 1

INVENTOR:
Daniel A. L. Texier

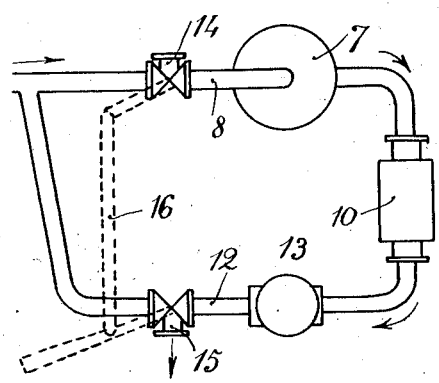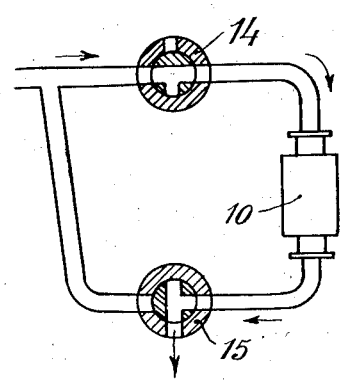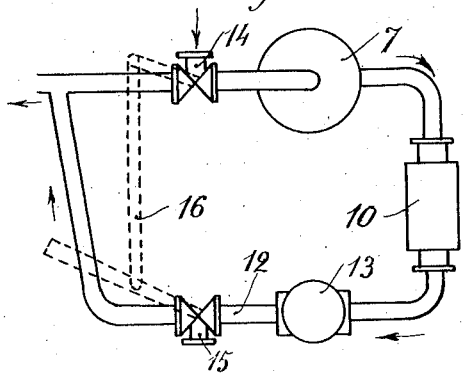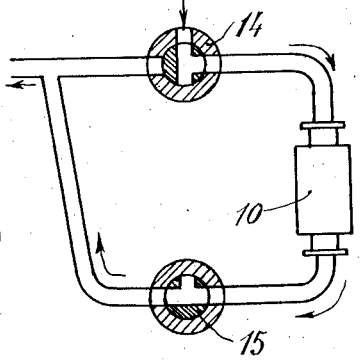

Patented Sept. 24, 1929

1,729,056

UNITED STATES PATENT OFFICE

DANIEL ARMAND LUCIAN TEXIER, OF NEUILLY-SUR-SEINE, FRANCE

MEANS FOR IMPREGNATING ARTICLES WITH SYNTHETIC RESINS

Application filed November 21, 1925, Serial No. 70,670, and in France and Great Britain October 27, 1925.

This invention relates to improvements in means for impregnating with synthetic resins, all articles such as electric bobbins, paper articles, wood articles, etc.

Impregnating with synthetic resins has for object to incorporate in the structure of an object, the synthetic resins which are subjected in the very heart of the said object, to physico-chemical changes.

The resin used, suitably heated, melts and then, following the known process, hardens by polymerization.

This resin, incorporated, thus transformed, gives various qualities to the object treated, such as rigidity, impermeability, unattackability by chemical agents and so on, and to a different degree according to the nature of the resin.

The resin may be used liquid or dissolved in a solvent in the form of a varnish. In either case the treatment consists in principle of the following steps:

1. Drying of the object to be impregnated.
2. Impregnation of the object.
3. Where the resin is used in the dissolved state, the extraction of the solvent.
4. Transformation of the resin from its initial state A to an intermediate state B.
5. Transformation of the resin from the intermediate state B to the definite state C.

These different physico-chemical operations require, for a good result, a particular procedure obtained by means of an assembly of apparatus and of particular means which essentially constitute the object of the present invention.

The installation in conformity with the invention comprises a stove which can be heated or cooled and in the inside of which can be produced either a vacuum or a compression.

This arrangement permits of effecting the following operations rapidly in the stove:

Drying the objects, preferably in a vacuum, in the neighbourhood of 100 degrees C.

Impregnating the objects, which can be done under pressure to assure the intimate penetration of the liquid; this operation requires a temperature fairly low—about 40 degrees C., in order to conserve the impregnating varnish.

Evaporation of the solvents, if necessary, at approximately 70 degrees C.

Polymerization, at about 140 degrees C.

The installation further comprises, an apparatus for producing a vacuum, which likewise can produce a compression if required, and a particular arrangement permitting the one or other of these applications.

A condenser connected with the stove to collect the volatilized products and an arrangement for exhausting the condensed products and recuperating them without disturbing the vacuum where this exists.

A degreasing or oil-freeing apparatus for the air arranged in the piping through which the air is ejected, in the stove.

The invention finally comprises various detail arrangements which will be referred to hereafter.

Figure 2:
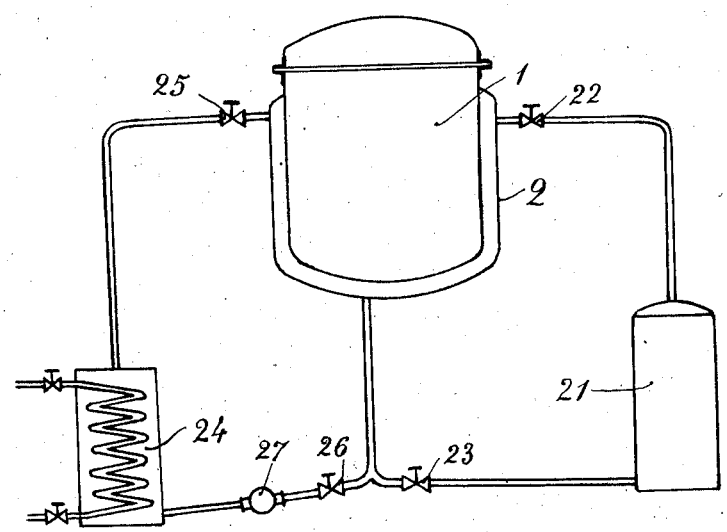
Figure 3:
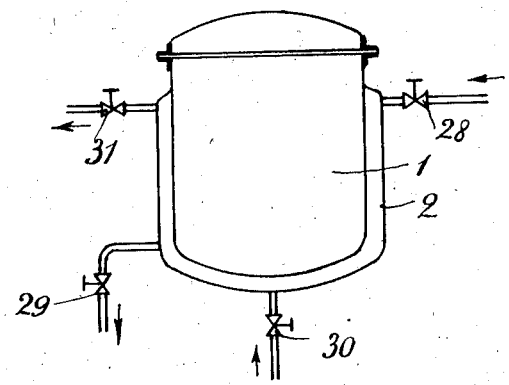

In order that the invention may be fully understood it has been shown diagrammatically in the accompanying drawings, by way of example, and in which:

Figure I shows the complete installation for the impregnation with synthetic resins, according to this invention; Figs. 2 and 3 show arrangements for heating and cooling the stove; Figs. 4, 5, 6 and 7 show the operation of the means which enable a single apparatus to be used for providing both the vacuum and the compression at the interior of the stove.

The installation comprises (Fig. 1) a stove 1 heated by a circulation of hot oil in a double casing 2. In the example shown the cooling is obtained by a cold water circulation in a serpentine pipe 3 immersed in the oil itself in the double wall casing.

The stove 1 is connected to a vessel 4 by piping 5 furnished with a cock 6. The vessel 4 contains the varnish of the synthetic resin or the liquid synthetic resin.

On the other hand the stove is likewise connected to a condenser 7 by piping 8 furnished with a cock 9 and to an apparatus 10 which can serve to provide a vacuum or compression in the stove. This apparatus can be of any type for example, a vacuum compressor pump.

The inlet or suction aperture of this apparatus 10 is thereby connected up to the condenser 7 by piping 11 and thence the condenser to the stove 1 through the piping 8. The exhaust opening is connected to the stove 1 by piping 12 which branches from the piping 8 between the stove and the condenser. On the exhaust tubing 12 is disposed an oil-freeing device for the air, which is of known construction.

A particular arrangement comprising two cocks each having three ways, 14, 15 controlled by a lever 16 permits of putting the stove 1 in communication with either the suction orifice or the exhaust orifice of apparatus 10.

The operation of this apparatus will be described later on.

The products condensed in the condenser 7 pass out into the reservoir 17 through piping 18 made of glass and permitting of regulating the outflow. A cock 19 permits of cutting off the reservoir 17 from the condenser 7 and a further cock 20 permits of emptying it.

The procedure is as follows:

The parts to be impregnated are dried in the stove 1 under a vacuum by preference and at about 100 degrees C.

The stove 1 is then cooled by the cooling means to a temperature which will not change the varnish—in principle about 40 degrees C. This cooling has the further effect to raise the degree of vacuum in the stove 1.

When this is accomplished the cock 6 is opened. The liquid contained in the vessel 4 rises owing to the vacuum in the stove 1 where it immerses the parts which have been dried. Then the cock is closed.

The parts are immersed for a suitable period, either under vacuum or under pressure to ensure the penetration of the liquid into the intimate structure of the parts, or again this can be done under atmospheric pressure.

The impregnation being finished the liquid is drawn off or exhausted into the vessel 4 through the opening in the cock 6.

Next the stove 1 is heated up to about 70 degrees C. so as to permit of the evaporation of the volatile solvents and in order to commence the transformation of the resin incorporated in the parts by reason of the impregnation.

During this operation, the cock 6 remains open so that the liquid which drains off the parts under treatment can return to the vessel 4 in which likewise condense the products of evaporation.

When this operation is terminated the cock 6 is closed and the stove is put in communication with the condenser 7. After this the temperature of the stove 1 is progressively raised in order to obtain the definite transformation or polymerization of the resin incorporated in the parts.

This operation may be effected at atmospheric pressure or under pressure. It may even be followed by the application of a vacuum in certain particular cases.

Two other arrangements have been illustrated in Fig. 2 and Fig. 3 for the purpose of assuring the heating and the cooling of the stove 1.

In the case of that shown at Fig. 2, as in the case of Fig. 1 the heating of the stove 1 is obtained by circulation of oil in a double casing. This oil during the periods of heating circulates through a re-heater 21. It can be isolated from the re-heater for the oil, 21, by cocks 22 and 23 and, during cooling, can be placed in communication with a refrigerator 24 by opening cocks 25 and 26. A pump 27, disposed in the refrigerator circuit, serves to ensure the circulation of the oil through the refrigerator 24.

In the arrangement shown at Fig. 3 the heating is effected by the circulation of steam through the double casing of the stove 1. The inlet of steam is adjusted by a cock 28 and a cock 29 is arranged between the outlet orifice and the mud cock.

The cooling is ensured by simple water circulation in the double wall. In the case of the steam cocks 28 and 29, these are closed and the cocks 30 and 31 for the inlet and outlet of the water are opened.

The stove 1 also comprises (Fig. 1) an extension 32 in which depends the piping 5 connecting the stove with the vessel 4. This extension 32 is likewise cooled; without this precaution, the resin might polymerize during the passage through this pipe and its hardening would risk causing the blockage of the piping.

The operation of the arrangement permitting of obtaining a vacuum or a compression in the stove 1 is shown in Figs. 4, 5, 6 and 7 in several diagrams corresponding to the different cases to be considered.

The arrangement comprises essentially as has been seen, two cocks each having three ways, marked 14, 15 operated by the same articulated lever 16. These cocks are arranged, the one 14 on the suction piping 8 and the other, 15, on the exhaust piping 12 for the vacuum compressor pump 10. The arrows indicate the direction of movement of the air or gases which are mixed with it.

In the case where it is desired to have a vacuum (Figs. 4 and 5) the gases are drawn into the stove 1 through the condenser 7. For this purpose the cock 14 places the stove in circuit with the inlet of apparatus 10.

The gases exhausted by apparatus 10 are driven out into the atmosphere through the cock 15.

When it is desired to compress the gas in the stove 1 (Figs. 6, 7) the cock 14 isolates stove 1 from the suction of apparatus 10 and the suction takes place in the free air through this same cock 14. On the contrary the cock 15 places the stove in communication with the exhausting apparatus 10; the exhausted air traverses, before reaching the stove, the oil-freeing or de-greasing device for the air, 13.

There has also been provided a device permitting the evacuation of the condensed products from the condenser 7 (see Fig. 1) in the case of where a vacuum is employed without it being necessary to destroy the vacuum either in the stove 1 or in the condenser 7.

For this purpose the cock 19 disposed between the condenser 7 and the recipient 17 is a three way cock.

When it is desired to empty the recipient 17 its communication with the condenser 7 is interrupted by means of the cock 19 which is then open to the atmosphere. The air entering the recipient 17 permits then of opening the evacuating cock 20.

The several apparatus shown and described have only been given by way of illustration. Their arrangements can vary according to their particular use within the scope of the principle underlying this invention.

I claim:

1. In an apparatus for impregnating with synthetic resin, the combination of a tight closing impregnating tank, a second tank concentrically disposed about said first tank in spaced relation thereto, means for circulating hot oil between said first and second tanks, a water circulating coil disposed between said first and second tanks, a resin containing tank, a conduit connecting the lower extremity of said first mentioned tank with said resin tank, and means for cooling the oil circulated between said first and second tanks.

2. In an apparatus for impregnating with synthetic resin, the combination of a tight closing impregnating tank, a second tank concentrically disposed about said first tank in spaced relation thereto, means for circulating hot oil between said first and second tanks, a water circulating coil disposed between said first and second tanks, a resin containing tank, a conduit connecting the lower extremity of said first mentioned tank with said resin tank, an outlet conduit connected to the upper extremity of said first named tank, an air circulating pump, a three-way cock interconnecting said outlet conduit and the inlet of said pump for establishing communication between said outlet conduit and the inlet of said pump or between said outlet conduit or said inlet and the atmosphere, and a second three way cock interconnecting said outlet conduit and the outlet of said pump for establishing communication between said outlet conduit and the outlet of said pump or between said outlet conduit or said pump outlet and the atmosphere, whereby said first mentioned tank may be subjected to a pressure or a vacuum from the same pump.

3. In an apparatus for impregnating with synthetic resin, the combination of a tight closing impregnating tank, a second tank concentrically disposed about said first tank in spaced relation thereto, means for circulating hot oil between said first and second tanks, a water circulating coil disposed between said first and second tanks, a resin containing tank, a conduit connecting the lower extremity of said first mentioned tank with said resin tank, an outlet conduit connected to the upper extremity of said first named tank, an air circulating pump, a three-way cock interconnecting said outlet conduit and the inlet of said pump for establishing communication between said outlet conduit and the inlet of said pump or between said outlet conduit or said inlet and the atmosphere, a second three-way cock interconnecting said outlet conduit and the outlet of said pump for establishing communication between said outlet conduit and the outlet of said pump or between said outlet conduit or said pump outlet and the atmosphere, whereby said first mentioned tank may be subjected to a pressure or a vacuum from the same pump, and a condenser interposed between said first three-way cock and said pump inlet.

4. In an apparatus for impregnating with synthetic resin, the combination of a tight closing impregnating tank, a second tank concentrically disposed about said first tank in spaced relation thereto, means for circulating hot oil between said first and second tanks, a water circulating coil disposed between said first and second tanks, a resin containing tank, a conduit connecting the lower extremity of said first mentioned tank with said resin tank, an outlet conduit connected to the upper extremity of said first named tank, an air circulating pump, a three-way cock interconnecting said outlet conduit and the inlet of said pump for establishing communication between said outlet conduit and the inlet of said pump or between said outlet conduit or said inlet and the atmosphere, a second three-way cock interconnecting said outlet conduit and the outlet of said pump for establishing communication between said outlet conduit and the outlet of said pump or between said outlet conduit or said pump outlet and the atmosphere, whereby said first mentioned tank may be subjected to a pressure or a vacuum from the same pump, and means for simultaneously operating said three-way cocks in unison.

5. In an apparatus for impregnating with synthetic resin, the combination of a tight closing impregnating tank, a second tank concentrically disposed about said first tank in spaced relation thereto, means for circulating hot oil between said first and second tanks, a water circulating coil disposed between said first and second tanks, a resin containing tank, a conduit connecting the lower extremity of said first mentioned tank with said resin tank, an air pump, means associated with said air pump for producing a vacuum or raising the pressure in said impregnating tank at will, a condenser cooperating with said means, a tank for receiving the products of condensation from said condenser, means for closing off the communication between said last tank and said condenser and establishing communication between said last tank and the atmosphere, and means for emptying said last tank.

6. In an apparatus for impregnating with synthetic resin, the combination of a tight closing impregnating tank, a second tank concentrically disposed about said first tank in spaced relation thereto, means for circulating hot oil between said first and second tanks, a water circulating coil disposed between said first and second tanks, a resin containing tank, a conduit connecting the lower extremity of said first mentioned tank with said resin tank, an air pump, means associated with said air pump for producing a vacuum or raising the pressure in said impregnating tank at will, a condenser cooperating with said means, a tank for receiving the products of condensation from said condenser, a three-way cock for closing off the communication between said last tank and said condenser and establishing communication between said last tank and the atmosphere, and means for emptying said last tank.

D. A. L. TEXIER.